United States Patent [19]

Leavitt

[11] 3,716,177

[45] Feb. 13, 1973

[54] FILM TRANSPORT

[75] Inventor: Minard A. Leavitt, Sepulveda, Calif.

[73] Assignee: Cutler-Hammer, Inc., Milwaukee, Wis.

[22] Filed: April 23, 1971

[21] Appl. No.: 136,867

[52] U.S. Cl. ........................226/1, 226/13, 226/108, 318/7

[51] Int. Cl. ............................................B65h 17/20

[58] Field of Search......226/108, 111, 13, 31, 36, 28, 226/178, 1; 318/7

[56] References Cited

UNITED STATES PATENTS

| | | | |
|---|---|---|---|
| 3,329,876 | 7/1967 | Branco | 318/7 |
| 3,563,492 | 2/1971 | Ferrier | 226/178 |

*Primary Examiner*—Richard A. Schacher
*Attorney*—Christie, Parker & Hale

[57] ABSTRACT

Film is guided in a path that extends across two spaced apart capstans in non-slipping contact therewith. A buffer disposed between a supply reel and one capstan, and a buffer disposed between a pickup reel and the other capstan serve to isolate the film between the capstans from tension variations imposed by the reel drive systems. The capstans are driven by motors that are electrically connected in series. The motors are actuated by a control signal representative of the deviation between the actual film transport speed and a desired value thereof. The torque responses of the motors and the resultant moments of inertia of the motors and their respective capstans are matched to each other. The film bears a coating of magnetic material suitable for recording sound signals and a recording station is disposed between the capstans in recording proximity to the magnetic coating.

17 Claims, 2 Drawing Figures

PATENTED FEB 13 1973

3,716,177

INVENTOR.
MINARD A. LEAVITT

BY

Christy, Parker & Hale
ATTORNEYS

FILM TRANSPORT

BACKGROUND OF THE INVENTION

This invention relates to film transport and, more particularly, to a film transport system and method for transporting film at a constant average speed between two spaced apart points and maintaining time dependent speed fluctuations at minimum levels.

There are a number of applications in which it is necessary to transport a length of film or tape at a constant speed. Among such applications is the recording of analog information on a magnetic tape or the dubbing of sound signals onto a magnetic sound track of motion picture film. In order to reproduce the recorded sound signal with fidelity, the film must be transported at the same speed during the playback as it was transported during recording or at a related speed. Practically, this requirement is met by transporting the film at the same predetermined constant speed during both recording and playback. It has been found expedient to transport the film with a capstan that is driven at a constant angular velocity by a velocity servo. Practical servo mechanisms provide excellent velocity control at lower control frequencies but are progressively less effective as the frequency of required corrections increases. Inertial filtering devices in the form of flywheels are commonly utilized to reduce velocity variations to acceptable levels when the frequencies of the perturbing forces are beyond practical servo control range. Ideally, such flywheels are placed at both entry and exit of the velocity controlled film path section to provide maximum isolation. Use of this ideal configuration has been limited because of the difficulty of providing a suitable control system to provide identical film velocities across each capstan without introducing undesirable tension variations in the intervening film path. Additionally, servo response has traditionally been limited by resonance between the flywheel inertia and the intervening film path compliance.

SUMMARY OF THE INVENTION

The invention, which is directed to a film path and control system allowing practical implementation of the ideal configuration, employs two spaced apart capstans across which a length of film is guided in non-slipping engagement. The same torque is applied to both capstans, which have associated with them the same moment of inertia. Thus, both capstans exert the same force on the film. The portion of the film between the capstans is thus isolated from variations in film tension or other perturbing forces generated in the remainder of the film path. Corrections introduced by the servo system to maintain constant velocity do not affect film tension between the capstans.

Preferably, the capstans are driven by motors having matched responses and the motors are connected in series so the same actuating current passes through the excitation windings of both motors. The actuating current is furnished by a tachometer that generates a signal proportional to the difference between the actual film transport speed, as represented by the angular velocity of one of the capstans, and a desired value thereof. A work station such as a sound recording head is disposed in the film path between the two capstans.

Preferably, the portion of the film between the capstans is isolated by a buffer disposed between a supply reel and the one capstan and a buffer disposed between a takeup reel and the other capstan. Consequently, variations in film tension brought about by the reel drive system are not transmitted to the portion of the film between the capstans.

BRIEF DESCRIPTION OF THE DRAWING

The features of a specific embodiment of the best mode contemplated of carrying out the invention are illustrated in the drawing, in which.

DETAILED DESCRIPTION OF THE SPECIFIC EMBODIMENT

Figure 1:
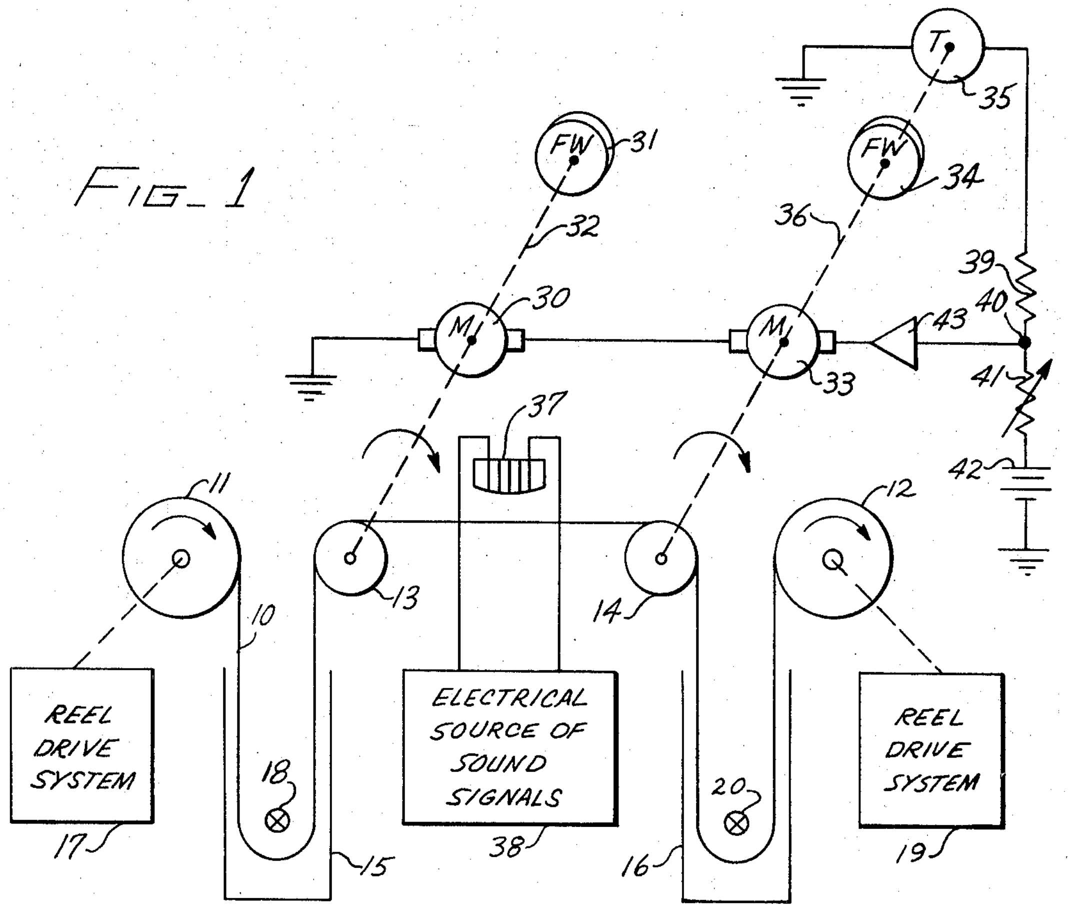
FIG. 1 is a schematic diagram of a film transport system incorporating the principles of the invention.

In FIG. 1 a length of film 10 is guided in a film path between a supply reel 11 and a takeup reel 12. A capstan 13 and a capstan 14 are disposed at spaced apart points in the film path such that film 10 extends across them in non-slipping contacting engagement therewith. A film buffer 15 is disposed in the film path between reel 11 and capstan 13, and a film buffer 16 is disposed in the film path between capstan 14 and reel 12. A reel drive system 17 rotates reel 11 clockwise, as represented by the arrow, so as to feed sufficient film to buffer 15 to maintain the loop length nominally at a value determined by a loop length sensor 18. Similarly, a reel drive system 19 rotates reel 12 clockwise, as represented by the arrow, so as to remove sufficient film from buffer 16 to maintain the loop length nominally at a value determined by a loop length sensor 20. Buffers 15 and 16 serve to isolate the portion of film 10 between capstans 13 and 14 from variations in film tension imposed by reel drive systems 17 and 19.

A motor 30, a flywheel 31, and capstan 13 are all mounted on a rotatable shaft represented schematically by a dashed line 32. Similarly, a motor 33, a flywheel 34, a tachometer 35, and capstan 14 are all mounted on a rotatable shaft represented schematically by a dashed line 36. As represented by the arrows, motor 30 drives capstan 13 in a clockwise direction to pull film out of buffer 15, and motor 33 drives capstan 14 in a clockwise direction to feed film into buffer 16. Thus, film transport takes place from left to right as viewed in FIG. 1.

Film 10 has along its length a track that bears a coating of magnetic material suitable for recording sound signals. A magnetic recording head 37 is located in recording proximity to the magnetic track on film 10 at a point in the film path between capstans 13 and 14. An electrical source of sound signals 38 is coupled to recording head 37 to impress on the magnetic track changes in magnetization corresponding to the sound signals from source 38.

The electrical terminals of tachometer 35 and a resistor 39 are connected in series between a node 40 and ground. A variable resistor 41 and a battery 42 are also connected in series between node 40 and ground. Node 40 is connected to the ungrounded input terminal of a high gain amplifier 43. The excitation windings of motors 30 and 33 are connected in series between the ungrounded output terminal of amplifier 43 and ground. Motor 33, tachometer 35, and amplifier 43 comprise a velocity servo that maintains the film transport speed between capstans 13 and 14 constant at a desired value that is set by adjusting resistor 41. The voltage at node 40 is representative of the deviation of the actual film transport speed from the desired value thereof. This serves as a control signal to actuate motors 30 and 33 in a sense to reduce the voltage at node 40. Flywheels 31 and 34 suppress any rapid fluctuations in transport speed. The torque responses of motors 30 and 33 to the common actuating current applied to their excitation windings are matched. As a result, motors 30 and 33 apply the same torque to capstans 13 and 14 because the motor excitation windings are connected in series. The resultant moments of inertia associated with capstans 13 and 14 are also matched. In other words, the resultant moment of inertia of capstan 13, motor 30, flywheel 31, and the shaft on which they are mounted equals the resultant moment of inertia of capstan 14, motor 33, flywheel 34, tachometer 35, and the shaft on which they are mounted. In general, flywheel 31 would be larger than flywheel 34 to compensate for the moment of inertia of tachometer 35. As a result, capstans 13 and 14 exert the same force on film 10. In summary, to the extent the motor torque responses and the resultant moments of inertia can in practice be matched, the variations in film tension are eliminated between capstans 13 and 14 where the recording process takes place.

Figure 2:
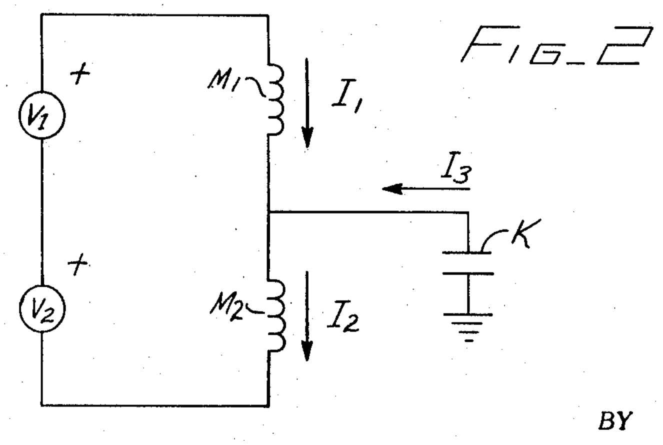
FIG. 2 is an electrical analog of a portion of the system of FIG. 1.

FIG. 2 shows an electrical analog of the pertinent portion of the transport system of FIG. 1. Inductor $M_1$ represents the resultant moment of inertia associated with capstan 13, inductor $M_2$ represents the resultant moment of inertia associated with capstan 14, capacitor K represents the elastic constant associated with the portion of film 10 between capstans 13 and 14, voltage source $V_1$ represents the torque generated by motor 30, voltage source $V_2$ represents the torque generated by motor 33, current $I_1$ represents the velocity of capstan 13, current $I_2$ represents the velocity of capstan 14, and current $I_3$ represents the relative velocity between two points on film 10, i.e. the rate of change of film tension of the portion of film 10 between capstans 13 and 14. Current $I_3$ equal to zero represents the case in which the film tension on the portion of film 10 between capstans 13 and 14 is constant. Current $I_1$ equals $I_2$ and current $I_3$ is zero, when voltage $V_1$ equals voltage $V_2$ and inductor $M_1$ equals inductor $M_2$. The variations in tension imposed by reel drive systems 17 and 19 are isolated from the portion of film 10 between capstans 13 and 14 by buffers 15 and 16. Thus, essentially constant tension is exerted on the film to the left of capstan 13 and to the right of capstan 14, this tension being equal to the weight of the nominal length of film in buffers 15 and 16.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. Depending on the torque producing device used, electrical connections other than series circuit might be used. The term "film" is used in this specification to include all flexible ribbon type media, e.g., photographic film, magnetic tape, paper tape, etc.

What is claimed is:

1. A film transport system comprising:
- a length of film;
- a first capstan;
- a second capstan;
- a work station communicating with the film at a point between the first and second capstans;
- a first motor mechanically coupled to the first capstan to rotate the first capstan, the first motor developing a torque responsive to an applied excitation signal;
- a second motor mechanically coupled to the second capstan to rotate the second capstan in the same direction as the first capstan, the second motor developing a torque responsive to an applied excitation signal;
- the torque responses of the motors to their respective applied excitation signals being matched to each other and the resultant moments of inertia associated with the capstans being matched to each other;
- means for guiding the length of film across the first and second capstans in non-slipping engagement therewith to transport the film past the work station from the first capstan to the second capstan responsive to the rotation of the capstans; and
- means for applying the same excitation signal to the first and second motors to apply the same torque to the first and second capstans.

2. The film transport system of claim 1, in which the applying means comprises means for connecting the first and second motors in series and a source of excitation current coupled to the first and second motors in series.

3. The film transport system of claim 2, additionally comprising means for sensing the transport speed of the film between the first and second capstans, the excitation current source producing a current representative of the deviation of the sensed film transport speed from a desired speed value.

4. The film transport system of claim 3, in which the film bears a coating of magnetic material suitable for recording sound signals, and the work station comprises a magnetic recording head in recording proximity to the magnetic coating and an electrical source of sound signals to be recorded on the film coupled to the magnetic recording head.

5. The film transport system of claim 4, additionally comprising a first flywheel mechanically coupled to the first motor and a second flywheel mechanically coupled to the second motor.

6. The film transport system of claim 5, additionally comprising a supply reel for storing the length of film, a first film buffer disposed in the film path between the supply reel and the first capstan, means for driving the supply reel to feed film to the first buffer as the first capstan removes film from the first buffer, a takeup reel for storing the length of film, a second film buffer disposed in the film path between the second capstan and the takeup reel, and means for driving the takeup reel to remove film from the second buffer as the second capstan feeds film to the second buffer.

7. The film transport system of claim 6, in which the means for sensing the transport speed of the film comprises a tachometer mechanically coupled to the second motor and the first flywheel is larger than the second flywheel.

8. The film transport system of claim 2, additionally comprising a supply reel for storing the length of film, a first film buffer disposed in the film path between the supply reel and the first capstan, means for driving the supply reel to feed film to the first buffer as the first capstan removes film from the first buffer, a takeup reel for storing the length of film, a second film buffer disposed in the film path between the second capstan and the takeup reel, and means for driving the takeup reel to remove film from the second buffer as the second capstan feeds film to the second buffer.

9. The film transport system of claim 1, additionally comprising means for sensing the transport speed of the film between the first and second capstans, the excitation current source producing a current representative of the deviation of the sensed film transport speed from a desired speed value.

10. The film transport system of claim 1, in which the film bears a coating of magnetic material suitable for recording sound signals, and the work station comprises a magnetic recording head in recording proximity to the magnetic coating and an electrical source of sound signals to be recorded on the film coupled to the magnetic recording head.

11. The film transport system of claim 1, additionally comprising a supply reel for storing the length of film, means for driving the supply reel to feed film to the first capstan, means in the film path between the supply reel and the first capstan for isolating the film fed to the first capstan from variations in film tension experienced by the film on the supply reel, a takeup reel for storing the length of film, means for driving the takeup reel to take film from the second capstan, and means in the film path between the second capstan and the takeup reel for isolating the film taken from the second capstan from variations in film tension experienced by the film on the takeup reel.

12. A system for transporting a length of flexible ribbon without introducing appreciable variations in the tension of the ribbon, the system comprising:

ribbon guiding means defining a ribbon path;

first means responsive to applied torque for driving ribbon at a first point along the path;

second means responsive to applied torque for driving ribbon in the same direction at a second point along the path displaced from the first point;

first means for generating a torque responsive to an applied excitation signal;

second means for generating a torque responsive to an applied excitation signal;

means for coupling the first torque generating means to the first ribbon driving means;

means for coupling the second torque generating means to the second ribbon driving means; and means for applying the same excitation signal to the first and second torque generating means.

13. The system of claim 12, additionally comprising a supply reel for ribbon storage, a first ribbon buffer disposed in the path between the supply reel and the first ribbon driving means, a takeup reel for ribbon storage, and a second ribbon buffer disposed in the path between the second ribbon driving means and the takeup reel.

14. The system of claim 13, in which the first and second means for driving ribbon comprise first and second capstans, the first and second torque generating means comprise first and second motors each having excitation windings, the first and second coupling means comprise first and second shafts connected respectively between the first motor and the first capstan and the second motor and the second capstan, and the applying means comprises means for sensing the actual speed at which ribbon is driven between the first and second capstans, means for generating a control signal representative of the difference between the actual speed and a desired speed, means for connecting the excitation windings of the first and second motors in series, and means for applying the control signal to the excitation windings in series, the torque responses of the motors being matched and the resultant moments of inertia associated with the capstans being matched.

15. The system of claim 14, additionally comprising a recording station located in the ribbon path between the first and second capstans to record information on the ribbon.

16. A method of transporting a length of film without introducing appreciable variations in film velocity or tension, the method comprising the steps of:

guiding the film in a film path that extends between two spaced apart capstans in non-slipping engagement with the film, the resultant moment of inertia associated with each capstan being the same;

coupling to one of the capstans a first motor that develops a torque responsive to an applied excitation signal;

coupling to the other capstan a second motor that develops a torque responsive to an applied excitation signal, the torque responses of the first and second motors to their respective excitation signals being matched to each other;

applying the same excitation signal to both of the first and second motors to apply the same torque to both capstans; and isolating the film in the film path between the capstans from variations in film tension along the remainder of the length of film.

17. The method of claim 16, comprising the additional steps of sensing the deviation of the actual transport speed of the film from a desired value and adjusting the torque applied to the capstans to reduce the deviation.

* * * * *